(12) United States Patent
Wood et al.

(10) Patent No.: US 7,661,195 B1
(45) Date of Patent: Feb. 16, 2010

(54) TOOL COUPLING AND DUST COLLECTION SYSTEM

(76) Inventors: Billy R. Wood, P.O. Box 3496, Grass Valley, CA (US) 95945; John M. Nolen, 5741 Angelo, Loomis, CA (US) 95650

( * ) Notice: Subject to any disclaimer, the term of this patent is extended or adjusted under 35 U.S.C. 154(b) by 195 days.

(21) Appl. No.: 11/779,684

(22) Filed: Jul. 18, 2007

Related U.S. Application Data (63) Continuation-in-part of application No. 11/539,467, filed on Oct. 6, 2006.

(51) Int. Cl.
*B23D 49/10* (2006.01)
*B27B 19/00* (2006.01)

(52) U.S. Cl. ............................. 30/392; 30/124
(58) Field of Classification Search ............... 30/124, 30/392–394; 403/335, 336, 337
See application file for complete search history.

(56) References Cited

U.S. PATENT DOCUMENTS

| | | | |
|---|---|---|---|
| 3,785,092 A * | 1/1974 | Hutchins | ............. 451/357 |
| 4,300,426 A | 11/1981 | Weaver | |
| 4,361,957 A | 12/1982 | Krotz et al. | |
| D292,407 S | 10/1987 | Legler et al. | |
| 5,034,041 A * | 7/1991 | Austin | ............. 55/385.1 |
| 5,084,972 A | 2/1992 | Waugh | |
| 5,675,895 A | 10/1997 | Mori et al. | |
| 5,688,082 A * | 11/1997 | Richardson | ............. 408/67 |
| 6,193,448 B1 * | 2/2001 | Brennan | ............. 408/67 |
| 6,470,778 B1 | 10/2002 | Kaye, Jr. et al. | |
| 6,678,959 B1 * | 1/2004 | Phillip et al. | ............. 30/277.4 |
| 2004/0060719 A1 | 4/2004 | Wiborg | |

* cited by examiner

*Primary Examiner*—Stephen Choi (57) ABSTRACT

A tool coupling and dust collection system for collecting dust and debris generated by the use of a reciprocal saw being releasably attached to the reciprocal saw. A planar foot is attached to and extends downwardly the plate. Each of a plurality of attachments is removably attached to the foot. A housing is positioned around the plate. The housing includes a top wall, a bottom wall and a perimeter wall to define a collection space. The bottom wall has an attachment aperture extending therethrough to permit the attachments coupled to the plate to extend from the housing. The top wall of the housing has a vacuum aperture extending therethrough. A vacuum hose is coupled to the top wall of the housing and in fluid communication with the vacuum aperture. A free end of the vacuum hose is mounted to a vacuum to vacuum the dust from the housing.

12 Claims, 7 Drawing Sheets

TOOL COUPLING AND DUST COLLECTION SYSTEM

This application is a continuation-in-part of application Ser. No. 11/539,467 filed on Oct. 6, 2006.

BACKGROUND OF THE INVENTION

1. Field of the Invention

The present invention relates to dust collection devices and more particularly pertains to a new dust collection device for collecting dust and debris generated by the use of a reciprocal saw.

2. Description of the Prior Art

The use of dust collection devices is known in the prior art. While these devices fulfill their respective, particular objectives and requirements, the need remains for a system that has certain improved features that surrounds a plate and attachment attached to reciprocal saw to collect dust and debris from directly around the attachment and plate. Additionally, the system should include a collar that extends around a portion of the reciprocal saw to inhibit the dust and debris exiting a housing of the system adjacent to the reciprocal saw.

SUMMARY OF THE INVENTION

The present invention meets the needs presented above by generally comprising a plate having a first side, a second side, a rear edge, a front edge, an upper edge and a lower edge. A male coupler is attached to the rear edge and is configured for releasably attachment to the reciprocal saw. A planar foot is attached to and extends downwardly from the lower edge. The foot is positioned adjacent to the front edge and is coplanar with the plate. The foot includes a distal edge with respect to the plate. Each of a plurality of attachments is removably attached to the foot. A housing is positioned around the plate. The housing includes a top wall, a bottom wall and a perimeter wall to define a collection space of the housing. The bottom wall has an attachment aperture extending therethrough to permit the attachments coupled to the plate to extend from the housing. The top wall of the housing has a vacuum aperture extending therethrough. A vacuum hose is coupled to the top wall of the housing and in fluid communication with the vacuum aperture. A free end of the vacuum hose is mounted to a vacuum to vacuum the dust from the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 9 thereof, a new dust collection device embodying the principles and concepts of the present invention and generally designated by the reference numeral 10 will be described.

Figure 1:
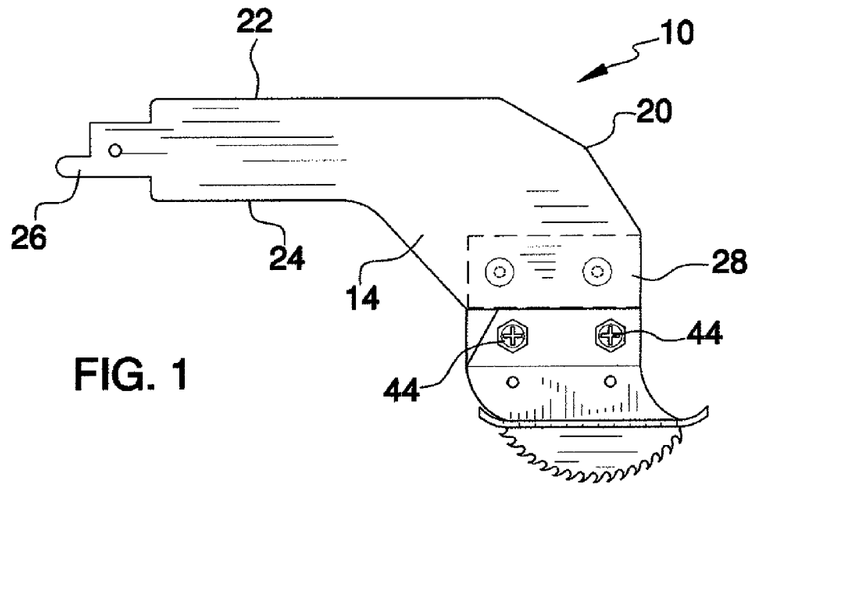
FIG. 1 is a side view of a reciprocal saw tool attaching assembly according to the present invention.
Figure 2:
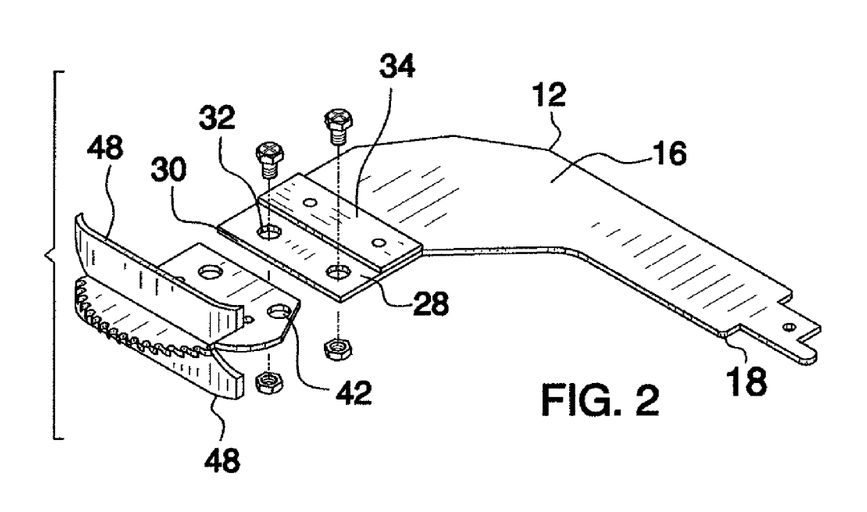
FIG. 2 is a perspective view of the present invention.

As best illustrated in FIGS. 1 through 9, the tool coupling and dust collection system 10 generally comprises a plate 12 that has a first side 14, a second side 16, a rear edge 18, a front edge 20, an upper edge 22 and a lower edge 24. A male coupler 26 is attached to the rear edge 18 and is configured for releasably attachment to the reciprocal saw 8. The male coupler 26 is a conventional coupler used for reciprocal saw 8 blades. A planar foot 28 is attached to and extends downwardly from the lower edge 24. The foot 28 is positioned adjacent to the front edge 20 and is coplanar with the plate 12. The foot 28 includes a distal edge 30 with respect to the plate 12. The foot 28 has an opening 32 extending therethrough positioned adjacent to the distal edge 30. There may be a pair of openings 32 as shown in FIG. 2. A shoulder member 34 is attached to the foot 28. The opening 32 is positioned between the shoulder member 34 and the distal edge 30.

A plurality of attachments 36 is provided. Each of the attachments 36 is removably attached to the foot 28 and each includes a top edge 38 and a bottom edge 40. The attachments 36 each have an aperture 42 extending therethrough. One of the attachments 36 is selectively abutted against the foot 28 to position the bottom edge 40 below the distal edge 30 and align the aperture 42 with the opening 32. A securing member 44 is extendable through an aligned one of the apertures 42 and the opening 32 to releasably secure the respective one of the attachments 36 to the foot 28. As with the foot 28, the attachments 36 may include two apertures 42 alignable with the openings 32. The securing member 44 or members includes a threaded bolt and a nut. The top edge 38 abuts the shoulder member 34 when the securing member 44 is extended through an aligned one of the apertures 42 and the opening 32 to prevent vertical movement of the selected one of the attachments 36.

Figure 3:
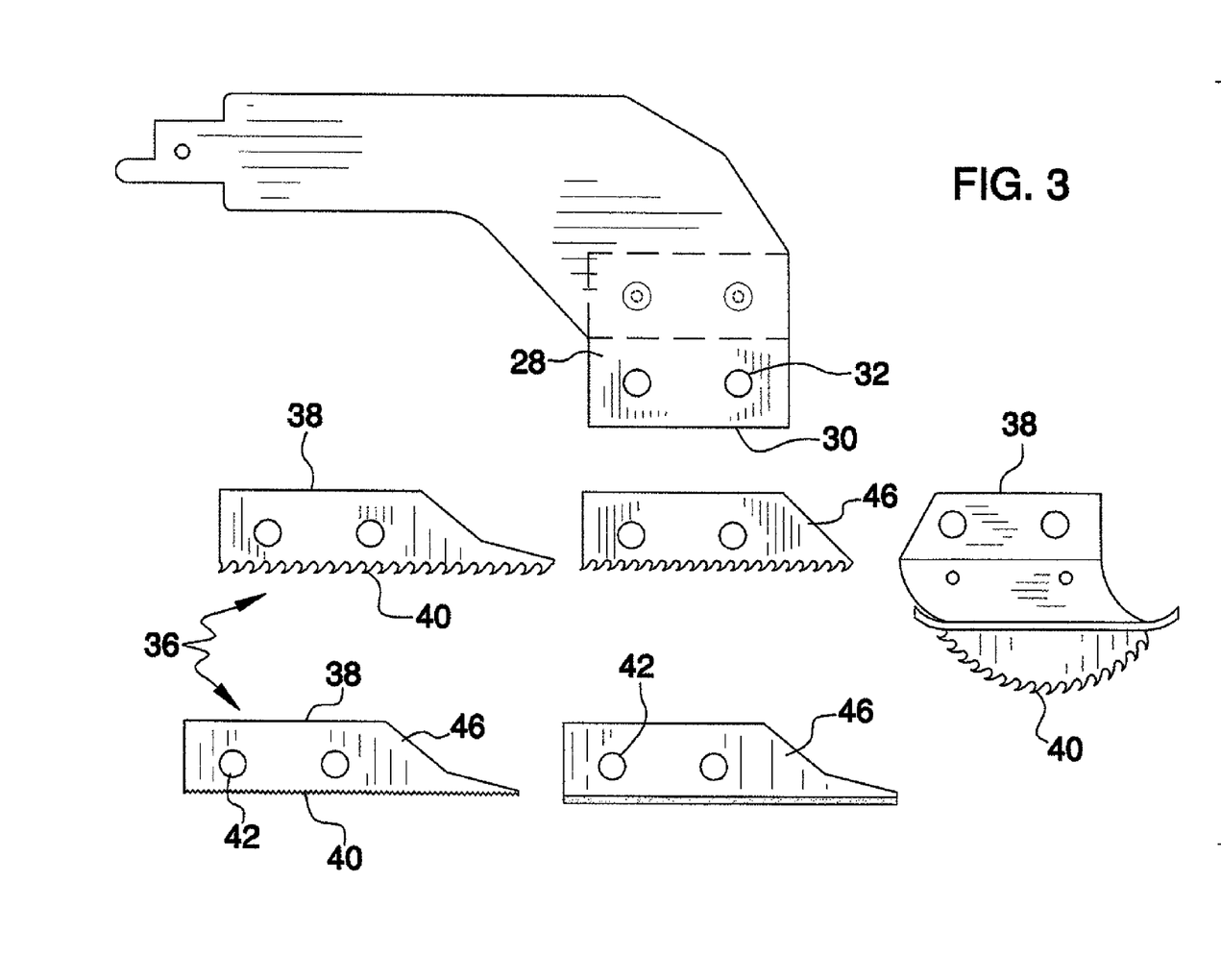
FIG. 3 is a side view of a plurality of blade attachments of the present invention.

The plurality of attachments 36 includes a plurality of blade members 46 shown in FIG. 3 each having the bottom edge 40 comprising a cutting edge. Each of the blade members 46 has a differently configured cutting edge such as variously sized serrations or a straight edge. At least one of the blade members 46 includes a pair of guards 48 each being attached to and extending in opposite directions from the blade member 46. The guards 48 are positioned between the aperture 42 and the bottom edge 40 of a respective one of the attachments 36 to only allow a selected depth of cutting. At least one of the cutting edges, or bottom edges 40, comprises an abrasive material 50 and may be used for grout removal and the like. This particular blade may have a greater width to better match conventional distance between tiles.

Figure 4:
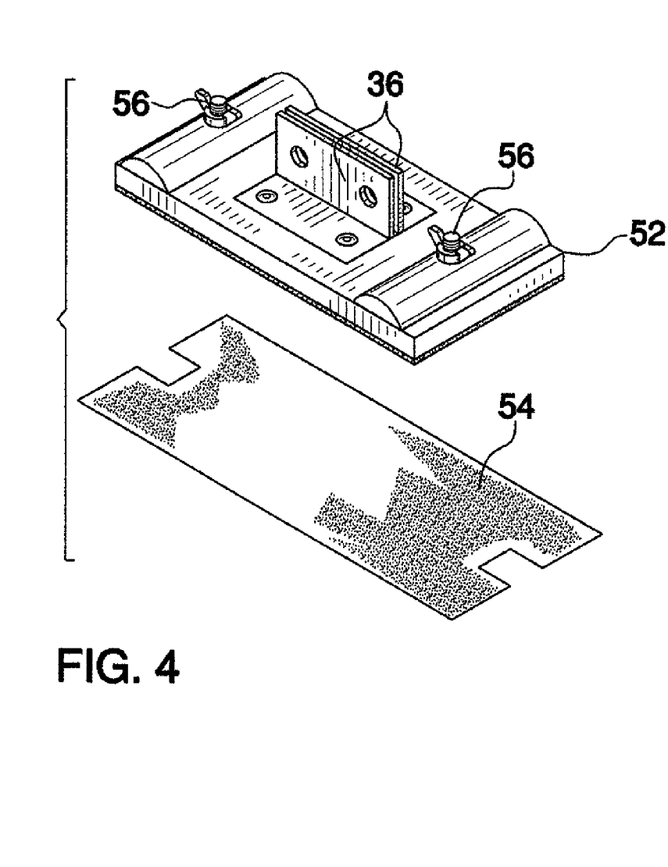
FIG. 4 is a perspective view of a sanding attachment of the present invention.
Figure 5:
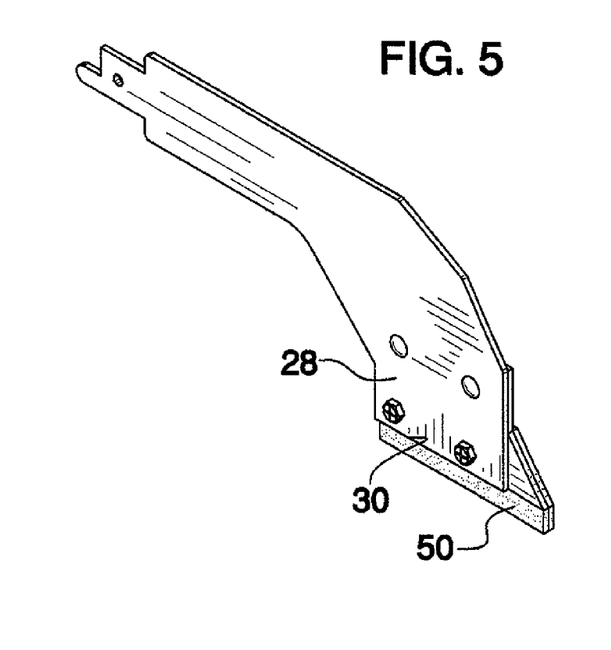
FIG. 5 is a perspective view of a blade attachment of the present invention.
Figure 6:
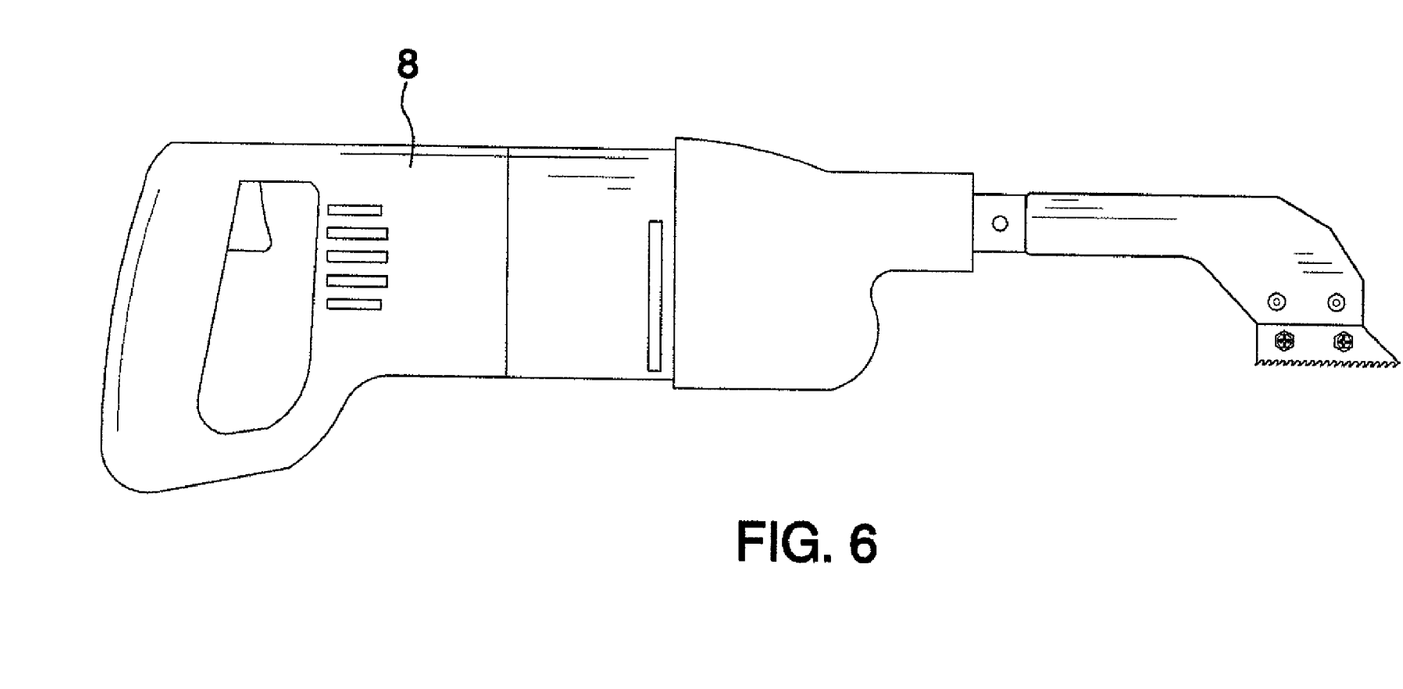
FIG. 6 is a side in-use view of the present invention.

The attachments 36 also include a sanding panel 52 that is attached to the bottom edge 40 and has a bottom side configured to receive a portion of sand paper 54. The sanding panel 52 may include a pair of spaced attachments 36 each positionable on either side of the foot 28. The sanding panel 52 is generally conventional and includes fasteners 56 to secure the sand paper 54 to the sanding panel 52.

Figure 7:
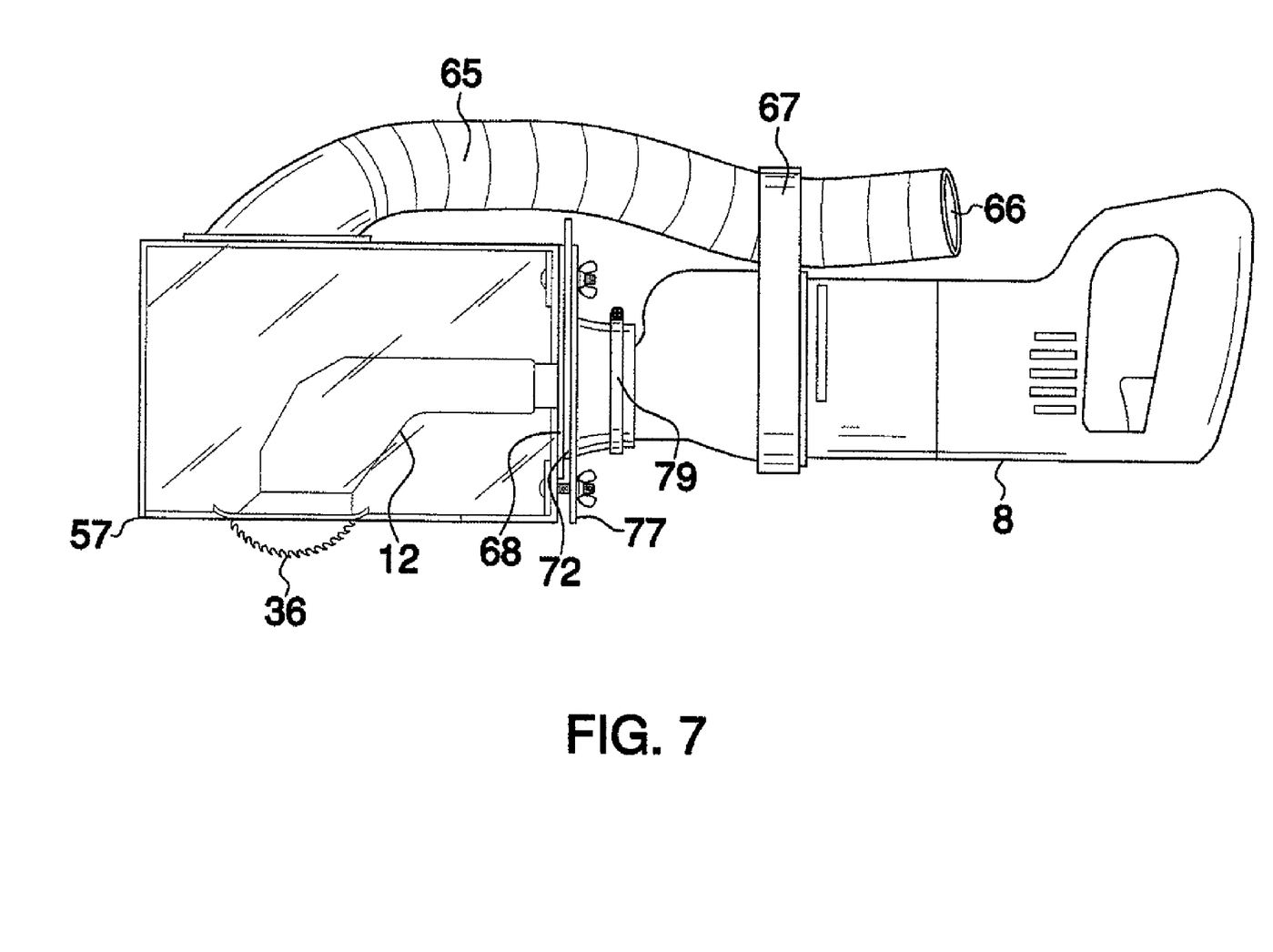
FIG. 7 is a side view of the present invention with the housing positioned around the plate.
Figure 8:
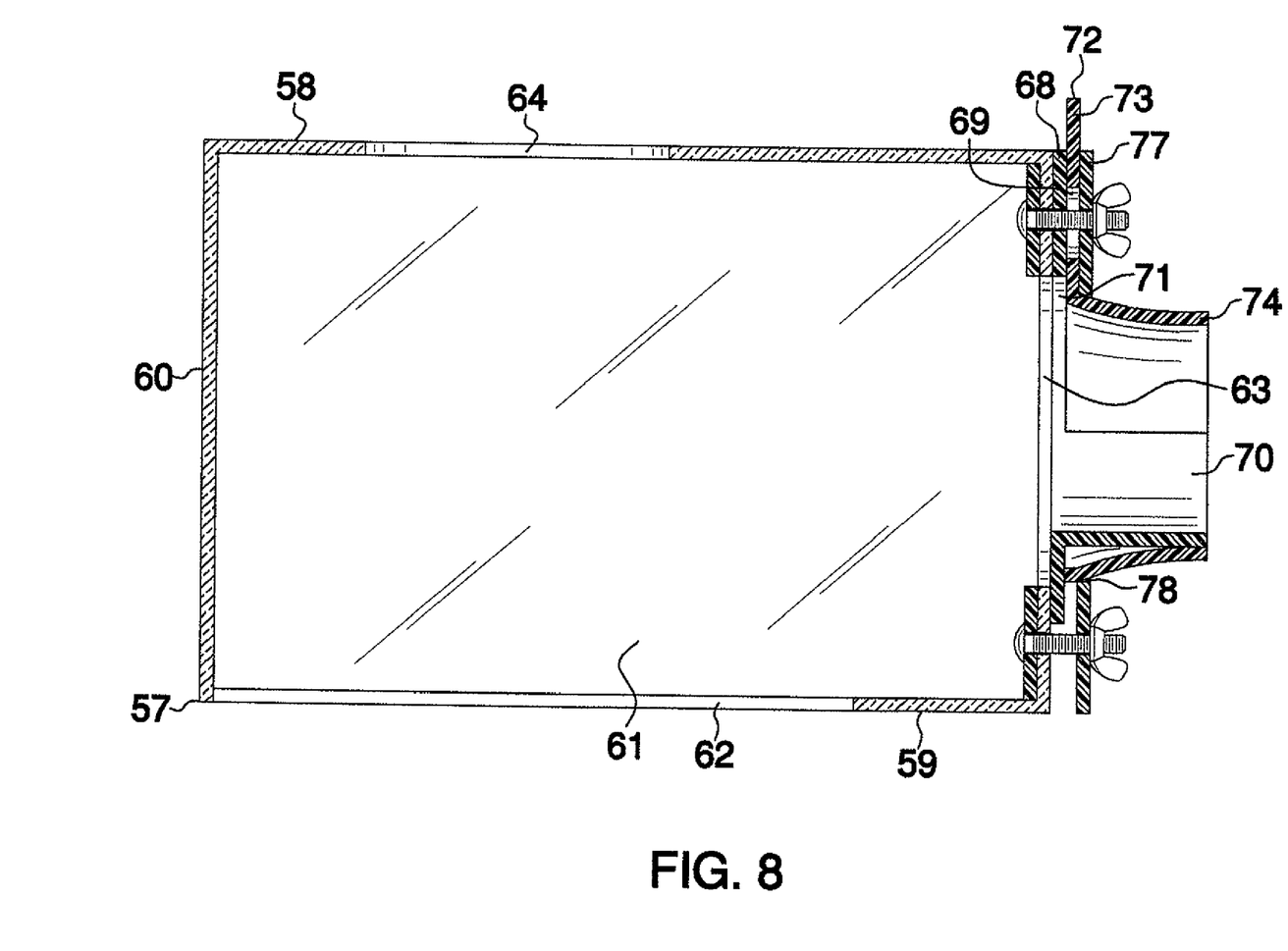
FIG. 8 is a cross-sectional view of the housing of the present invention.
Figure 9:
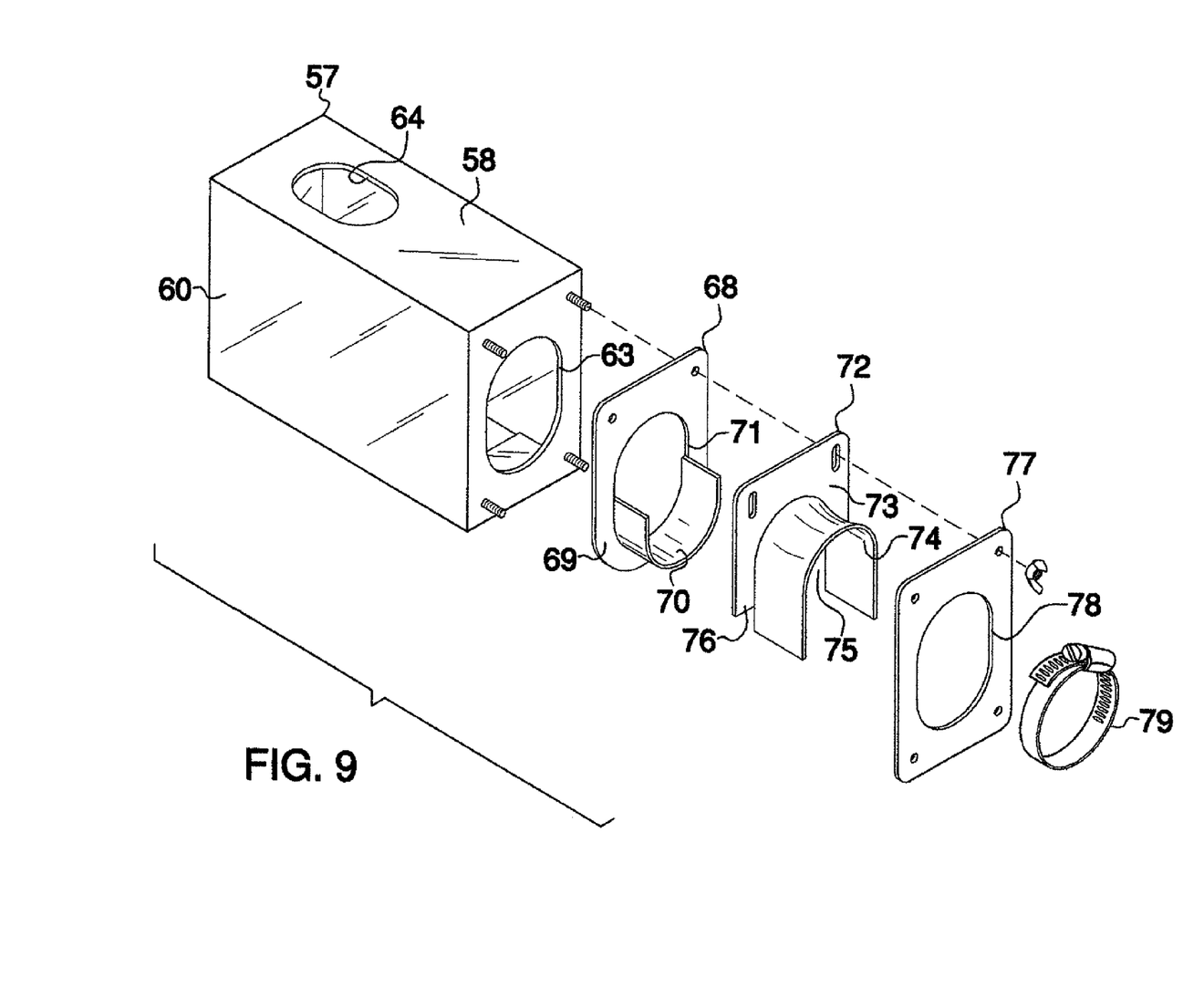
FIG. 9 is an exploded view of the present invention.

A housing 57 is positioned around the plate 12. The housing 57 includes a top wall 58, a bottom wall 59 and a perimeter wall 60 defining a collection space 61 of the housing 57. The bottom wall 59 has an attachment aperture 62 extending therethrough to permit the attachments 36 coupled to the plate 12 to extend from the housing 57. The perimeter wall 60 has a mounting aperture 63 extending therethrough to permit the plate 12 to extend from the housing 57 to be attached to the reciprocal saw. The top wall 58 of the housing 57 has a vacuum aperture 64 extending therethrough. The housing 57 is comprised of a transparent material to allow viewing into the housing 57.

A vacuum hose 65 is coupled to the top wall 58 of the housing 57 and in fluid communication with the vacuum aperture 64. A free end 66 of the vacuum hose 65 is mounted to a vacuum to vacuum the dust from the housing 57. A securing strap 67 is extended around a section of the reciprocal saw and a section of the vacuum hose 65 to secure the vacuum hose 65 to the reciprocal saw.

A lower mounting collar 68 is mounted to the housing 57 adjacent the mounting aperture 63. The lower mounting collar 68 includes a first collar plate 69 12 and a lower collar 70 coupled to and that extends outwardly from the first collar plate 69 12. The first collar plate 69 12 is mounted to the housing 57. The first collar plate 69 12 has an access aperture 71 aligned with the mounting aperture 63 of the housing 57. The lower collar 70 extends around a portion of the mounting aperture 63. The lower collar 70 is approximately U-shaped. The lower collar 70 is comprised of a flexible material.

An upper mounting collar 72 is mounted to the housing 57. The upper mounting collar 72 includes a second collar plate 73 12 and an upper collar 74 coupled to and extending outwardly from the second collar plate 73 12. The second collar plate 73 12 is mounted to the housing 57 with the first collar plate 69 12 positioned between the housing 57 and the second collar plate 73 12. The second collar plate 73 12 has a cutout 75 extending through a bottom end 76 thereof. The cutout 75 is aligned with the access aperture 71 of the lower mounting collar 68. The upper collar 74 extends around the cutout 75 aperture and beyond the bottom end 76. The upper collar 74 is approximately U-shaped and overlaps a portion of the lower collar 70 when the second collar plate 73 12 is mounted to the housing 57. The lower collar 70 is comprised of a flexible material.

A securing plate 77 12 is mounted to the housing 57. The first collar plate 69 12 and the second collar plate 73 12 are positioned between the securing plate 77 12 and the housing 57 when the securing plate 77 12 is mounted to the housing 57. The securing plate 77 12 has a collar aperture 78 extending therethrough to permit the upper collar 74 and the lower collar 70 to extend through the securing plate 77 12.

A securing band 79 is extended around the upper collar 74 and the lower collar 70. A diameter of the securing band 79 is adjustable to compress the upper collar 74 and the lower collar 70 around a section of the reciprocal saw extending through the mounting aperture 63 to inhibit the dust passing through the mounting aperture 63 and back along the reciprocal saw.

In use, a user of the assembly 10 attaches the plate 12 to the reciprocal saw 8 and then selects the attachment 36 to be used. The attachments 36 are spaced from the saw 8 by the foot 28 for more accurate cutting and allow for sanding attachments 36 to more easily be used. The foot 28 also allows for much quicker removal and changing of cutting or sanding tools. The housing 57 is positioned around the plate 12 with the attachments 36 extending out of the housing 57. As the attachments 36 generate dust and debris, the dust and debris are collected in the collection space 61 of the housing 57. The vacuum hose 65 allows a vacuum to suck the dust and debris from the collection space 61.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A tool coupling and dust collection system for a reciprocal saw, said apparatus comprising:
    a plate having a first side, a second side, a rear edge, a front edge, an upper edge and a lower edge, a male coupler being attached to said rear edge and being configured for releasably attachment to the reciprocal saw, a planar foot being attached to and extending downwardly from said lower edge, said foot being positioned adjacent to said front edge and being coplanar with said plate, said foot including a distal edge with respect to said plate;
    a plurality of attachments, each of said attachments being removably attached to said foot;
    a housing being positioned around said plate, said housing including a top wall, a bottom wall and a perimeter wall defining a collection space of said housing, said bottom wall having an attachment aperture extending therethrough to permit said attachments coupled to said plate to extend from said housing, said top wall of said housing having a vacuum aperture extending therethrough;
    a vacuum hose being coupled to said top wall of said housing and in fluid communication with said vacuum aperture, a free end of said vacuum hose being mounted to a vacuum to vacuum the dust from said housing;
    a lower mounting collar being mounted to said housing adjacent a mounting aperture extending into said perimeter wall to permit said plate to extend from said housing to be attached to the reciprocal saw;
    said lower mounting collar including a first collar plate and a lower collar being coupled to and extending outwardly from said first collar plate, said first collar plate being mounted to said housing, said first collar plate having an access aperture being aligned with said mounting aperture of said housing, said lower collar extending around a portion of said mounting aperture
    an upper mounting collar being mounted to said housing; and
    said upper mounting collar including a second collar plate and an upper collar being coupled to and extending outwardly from said second collar plate, said second collar plate being mounted to said housing with said first collar plate positioned between said housing and said second collar plate.

2. The system according to claim 1, wherein said perimeter wall has a mounting aperture extending therethrough to permit said plate to extend from said housing to be attached to the reciprocal saw.

3. The system according to claim 1, wherein said housing is comprised of a transparent material to allow viewing into said housing.

4. The system according to claim 1, wherein said lower collar is approximately U-shaped.

5. The system according to claim 1, wherein said lower collar is comprised of a flexible material.

6. The system according to claim 1, wherein said second collar plate has a cutout extending through a bottom end thereof, said cutout being aligned with said access aperture of said lower mounting collar, said upper collar extending around said cutout aperture and beyond said bottom end.

7. The system according to claim 6, wherein said upper collar is approximately U-shaped and overlaps a portion of said lower collar when said second collar plate is mounted to the housing.

8. The system according to claim 6, wherein said lower collar is comprised of a flexible material.

9. The system according to claim 1, further comprising a securing plate being mounted to said housing, said first collar plate and said second collar plate being positioned between said securing plate and said housing when said securing plate is mounted to said housing, said securing plate having a collar aperture extending therethrough to permit said upper collar and said lower collar to extend through said securing plate.

10. The system according to claim 1, further comprising a securing band being extended around said upper collar and said lower collar, a diameter of said securing band being adjustable to compress said upper collar and said lower collar around a section of the reciprocal saw extending through said mounting aperture to inhibit the dust passing through the mounting aperture and back along the reciprocal saw.

11. The system according to claim 1, further comprising a securing strap being extended around a section of the reciprocal saw and a section of said vacuum hose to secure said vacuum hose to the reciprocal saw.

12. A tool coupling and dust collection system for a reciprocal saw, said apparatus comprising:

a plate having a first side, a second side, a rear edge, a front edge, an upper edge and a lower edge, a male coupler being attached to said rear edge and being configured for releasably attachment to the reciprocal saw, a planar foot being attached to and extending downwardly from said lower edge, said foot being positioned adjacent to said front edge and being coplanar with said plate, said foot including a distal edge with respect to said plate;

a plurality of attachments, each of said attachments being removably attached to said foot;

a housing being positioned around said plate, said housing including a top wall, a bottom wall and a perimeter wall defining a collection space of said housing, said bottom wall having an attachment aperture extending therethrough to permit said attachments coupled to said plate to extend from said housing, said perimeter wall having a mounting aperture extending therethrough to permit said plate to extend from said housing to be attached to the reciprocal saw, said top wall of said housing having a vacuum aperture extending therethrough, said housing being comprised of a transparent material to allow viewing into said housing;

a vacuum hose being coupled to said top wall of said housing and in fluid communication with said vacuum aperture, a free end of said vacuum hose being mounted to a vacuum to vacuum the dust from said housing;

a lower mounting collar being mounted to said housing adjacent said mounting aperture, said lower mounting collar including a first collar plate and a lower collar being coupled to and extending outwardly from said first collar plate, said first collar plate being mounted to said housing, said first collar plate having an access aperture being aligned with said mounting aperture of said housing, said lower collar extending around a portion of said mounting aperture, said lower collar being approximately U-shaped, said lower collar being comprised of a flexible material;

an upper mounting collar being mounted to said housing, said upper mounting collar including a second collar plate and an upper collar being coupled to and extending outwardly from said second collar plate, said second collar plate being mounted to said housing with said first collar plate positioned between said housing and said second collar plate, said second collar plate having a cutout extending through a bottom end thereof, said cutout being aligned with said access aperture of said lower mounting collar, said upper collar extending around said cutout aperture and beyond said bottom end, said upper collar being approximately U-shaped and overlapping a portion of said lower collar when said second collar plate is mounted to the housing, said lower collar being comprised of a flexible material;

a securing plate being mounted to said housing, said first collar plate and said second collar plate being positioned between said securing plate and said housing when said securing plate is mounted to said housing, said securing plate having a collar aperture extending therethrough to permit said upper collar and said lower collar to extend through said securing plate;

a securing band being extended around said upper collar and said lower collar, a diameter of said securing band being adjustable to compress said upper collar and said lower collar around a section of the reciprocal saw extending through said mounting aperture to inhibit the dust passing through the mounting aperture and back along the reciprocal saw; and a securing strap being extended around a section of the reciprocal saw and a section of said vacuum hose to secure said vacuum hose to the reciprocal saw.

* * * * *